(12) United States Patent
Chen

(10) Patent No.: US 11,060,483 B2
(45) Date of Patent: Jul. 13, 2021

(54) HYBRID ROCKET ENGINE WITH IMPROVED SOLID FUEL SEGMENT

(71) Applicant: TAIWAN INNOVATIVE SPACE, INC., Miaoli County (TW)

(72) Inventor: Yen-Sen Chen, Miaoli County (TW)

(73) Assignee: Taiwan Innovative Space, Inc., Zhunan Township (TW)

( * ) Notice: Subject to any disclaimer, the term of this patent is extended or adjusted under 35 U.S.C. 154(b) by 157 days.

(21) Appl. No.: 16/351,179

(22) Filed: Mar. 12, 2019

(65) Prior Publication Data

US 2020/0291899 A1  Sep. 17, 2020

(51) Int. Cl.

| *F02K 9/72* | (2006.01) |
| *F02K 9/32* | (2006.01) |
| *F02K 9/52* | (2006.01) |
| *B64G 1/40* | (2006.01) |

(52) U.S. Cl.
CPC .............. *F02K 9/72* (2013.01); *B64G 1/404* (2013.01); *F02K 9/32* (2013.01); *F02K 9/52* (2013.01)

(58) Field of Classification Search
CPC ... B64G 1/404; F02K 9/10; F02K 9/52; F02K 9/72; F02K 9/32
See application file for complete search history.

(56) References Cited

U.S. PATENT DOCUMENTS

| 3,423,943 A * | 1/1969 | Stark .................. F02K 9/72 60/251 |
| 5,101,623 A * | 4/1992 | Briley ................. F02K 9/72 239/132 |
| 2016/0194256 A1* | 7/2016 | Whitmore ............ C06B 45/00 149/2 |

* cited by examiner

*Primary Examiner* — Todd E Manahan
*Assistant Examiner* — Kyle Robert Thomas
(74) *Attorney, Agent, or Firm* — Wang Law Firm, Inc.

(57) ABSTRACT

A rocket engine with an improved solid fuel segment mainly comprises a combustion chamber, a solid fuel segment installed in the combustion chamber, and an oxidizer injector installed at one end of the combustion chamber. The solid fuel segment surrounds and forms a trajectory to allow the oxidizer injector to inject oxidizer into the trajectory, in particular, on the solid fuel segment is formed with a plurality of protrusions, between the each two protrusions are defined a recess, a flame holding hot-gas region is formed between the protrusion and the recess, so as to produce eddy current in the flame holding hot-gas region when the propellant mixture is burned inside the trajectory, such that the whole solid fuel segment can produce even regression rate and high combustion efficiency.

9 Claims, 10 Drawing Sheets

HYBRID ROCKET ENGINE WITH IMPROVED SOLID FUEL SEGMENT

BACKGROUND OF THE INVENTION

Field of Invention

The present invention relates to the field of rocket fuel, and more particularly to a hybrid rocket engine with an improved solid fuel segment.

Related Art

Rocket fuels are mainly divided into types for solid rocket, liquid rocket and hybrid rocket. The fuel of solid rocket motors is directly installed at the rear of the rocket. When used, an igniter is used to initiate fuel combustion and generate thrust to push the rocket. Because solid rocket fuel does not require additional fuel tanks or pipelines for delivery or pressurization, solid rocket motors are much simpler than liquid rocket engines.

Liquid rockets employ rocket engines that use propellant mixture and oxidizer as their energy source. The basic components of a liquid rocket engine include a thrust chamber, a propellant supply system, and an engine control system. The liquid propellant is stored in a propellant tank. When the engine is working, the propellant is delivered to a combustion chamber under the action of the propellant supply system according to the required pressure and flow rate, and is atomized, evaporated, mixed and burned to generate high temperature and high pressure gas, and then accelerated to supersonic speed and discharged through a nozzle to generate thrust.

The hybrid rocket's propellant mainly contains solid fuel and liquid oxidizer. It not only has the capability of controlling the thrust, the feature of system simplicity relatively low cost, but also has higher safety than solid rocket or liquid rocket.

FIG. 1 shows a schematic diagram of the main structure of a hybrid rocket engine, which mainly comprises a combustion chamber 11, the combustion chamber 11 is surrounded by a bulkhead 111 to define a combustion port 112. A wall surface of the bulkhead 111 facing the combustion port 112 is installed with a solid fuel segment 12. The combustion chamber 11 is installed with an oxidizer injector 13 at one end of the combustion port 112, and the combustion chamber 11 is installed with a nozzle 14 at another end opposite to the oxidizer injector 13.

Surrounded by the solid fuel segment 12, a hot gas trajectory 113 is formed in the combustion port 112 to communicate with the nozzle 14 along an axial direction X. During the combustion process, the oxidizer injector 13 injects oxidizer toward the trajectory 113, and after ignition, a diffusion flame is generated in the trajectory 113 along the axial direction X, and the diffusion flame burns the solid fuel segment 12 along the axial direction X.

However, the combustion efficiency of the diffusion flame is different at each position along the trajectory 113, for example, the combustion efficiency of the diffusion flame closer to the nozzle 14 is more efficient, resulting in the solid fuel segment 12 being unable to have uniform regression rate and high combustion efficiency.

SUMMARY OF THE INVENTION

An objective of the present invention is to solve the problem that the diffusion flame cannot burn the solid fuel segment with uniform regression rate, and at the time enhancing the combustion efficiency of the hybrid rocket engine.

In order to achieve the aforementioned objective, the present invention is a hybrid rocket engine with an improved solid fuel segment, comprising:

a combustion chamber with a bulkhead surrounding and defining a combustion port, one end of the bulkhead being disposed with an oxidizer injector, and another end opposite to the oxidizer injector being disposed with a nozzle, and a direction of the oxidizer injector extending to the nozzle is an axial direction; and a solid fuel segment installed in the combustion port and located on the bulkhead, on the solid fuel segment being disposed with a plurality of protrusions along the axial direction, each of the plurality of protrusions having a protrusion top surface, a first distance being between the protrusion top surface of each of the plurality of protrusions and the bulkhead, and a recess being formed between any two adjacent ones of the plurality of protrusions, the recess having a recess top surface, a second distance being between the recess top surface and the bulkhead, and the first distance being greater than the second distance.

Preferably, the nozzle has a nozzle throat, the nozzle throat has a diameter extending along a radial direction, a length of the first distance is 10% to 50% of the diameter of the nozzle throat.

In order to achieve the aforementioned objective, a second embodiment of the present invention is a rocket engine with an improved solid fuel segment, comprising:

a combustion chamber with a bulkhead surrounding and defining a combustion port, one end of the bulkhead is disposed with an oxidizer injector, and another end opposite to the oxidizer injector being disposed with a nozzle, and a direction of the oxidizer injector extending to the nozzle is an axial direction; and a solid fuel segment installed in the combustion chamber and located on the bulkhead, on the solid fuel segment being disposed with a plurality of protrusions along the axial direction, each of the plurality of protrusions having a protrusion top surface, a solid fuel segment installed in the combustion port and located on the bulkhead, on the solid fuel segment being disposed with a plurality of protrusions along the axial direction, and a recess being formed between any two adjacent ones of the plurality of protrusions, and each of the recesses having a flame holding hot-gas region.

Preferably, each of the protrusion top surfaces respectively has a first length along the axial direction, and one end of the combustion chamber extends to another end is a second length, and each of the first lengths is 5% to 25% of a total length of the second length.

Preferably, the oxidizer injector comprises a body, the body has a feed passage as well as a first runner assembly and a second runner assembly communicating with the feed passage. The feed passage has an axis, the first runner assembly and the second runner assembly are sequentially arranged along the axis. The first runner assembly has a plurality of forward runners, and the second runner assembly has a plurality of reverse runners, each of the forward runners is disposed along a forward running direction, and each of the reverse runners is disposed along a reverse running direction. Taking a forward runner and a reverse runner that are adjacent to the axis in an opposite manner as a group, the forward running direction along which the forward runner of the group is disposed is defined as a first forward running direction, and the reverse running direction along which the reverse runner of the group is disposed is defined as a first reverse running direction. The first forward running direction and the first reverse running direction extend and a position of intersection is an intersection point, an extending direction extending from the intersection point to the axis is a central axis, the first forward runners are on one side of the central axis, and the first reverse runners are on another side of the central axis. A forward angle is formed between the first forward running direction and the central axis, a reverse angle is formed between the first reverse running direction and the central axis, and an absolute value of the forward angle and an absolute value of the reverse angle are equal.

Preferably, the absolute value of the forward angle and the absolute value of the reverse angle are between 20 and 80 degrees.

Preferably, the body has an inner wall surface facing the feed passage, an injection angle is formed between each of the forward runners and the inner wall surface, as well as between each of the reverse runners and the inner wall surface, the injection angle is located on a side close to the nozzle, and the injection angle is between 20 and 90 degrees.

In order to achieve the aforementioned objective, a third embodiment of the present invention is a rocket engine with an improved solid fuel segment, comprising:

a combustion chamber
a solid fuel segment installed in the combustion chamber; and
an oxidizer injector installed in the combustion chamber, the oxidizer injector injecting an oxidizer into the combustion chamber, and generating a plurality of flame holding hot-gas regions on the solid fuel segment.

By forming the diffusion flame with flame holding hot-gas regions on the solid fuel segment surface, a more uniform regression rate of the solid fuel segment can be maintained from ignition through certain burn time. Therefore, high combustion efficiency is established from engine startup and maintained later on by the oxidizer injection mechanism provided by the injector when the port diameter is enlarged.

DETAILED DESCRIPTION OF THE INVENTION

The foregoing and other technical contents, features and effects of the present invention to achieve the above object will be clearly presented in the following detailed description of the preferred embodiments with reference to the drawings.

Figure 1:
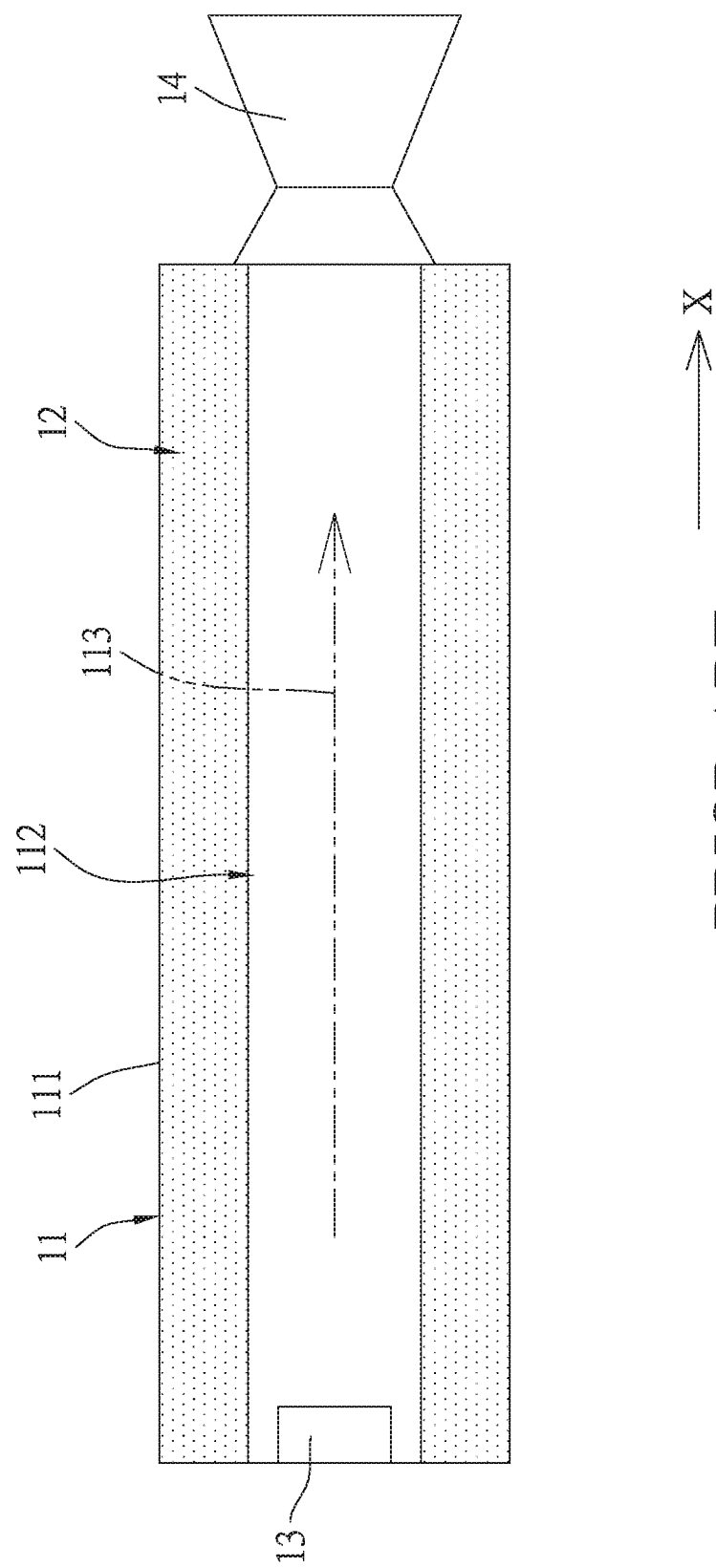
FIG. 1 is a cross-sectional view of a rocket engine of conventional hybrid rocket.
Figure 2:
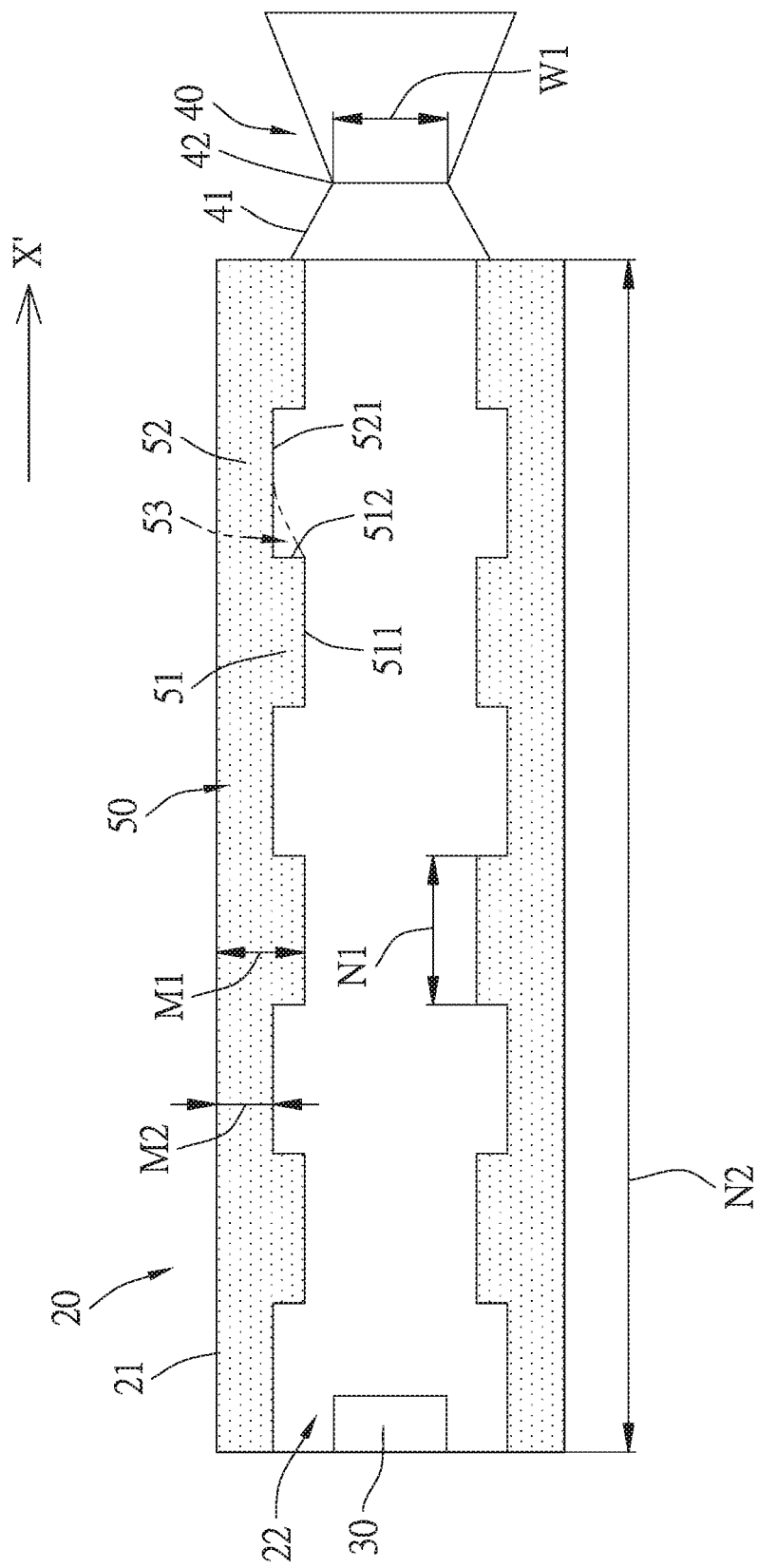
FIG. 2 is a cross-sectional view according to a first embodiment of the present invention.

Please refer to FIG. 2, the present invention is a rocket engine with an improved solid fuel segment, which mainly comprises a combustion chamber 20 and a solid fuel segment 50.

The combustion chamber 20 has a bulkhead 21 surrounding and defining a combustion port 22, one end of the bulkhead 21 is disposed with an oxidizer injector 30, and another end opposite to the oxidizer injector 30 is disposed with a nozzle 40, and a direction of the oxidizer injector 30 extending to the nozzle 40 is an axial direction X'. In the present embodiment, the oxidizer injector 30 is disposed in the combustion port 22, and the oxidizer injector 30 injects oxidizer along the axial direction X'.

The solid fuel segment 50 is installed in the combustion port 22 and located on the bulkhead 21, on the solid fuel segment 50 is disposed with a plurality of protrusions 51 along the axial direction X', each of the protrusions 51 has a protrusion top surface 511, a first distance M1 is between the protrusion top surface 511 of each of the protrusions 51 and the bulkhead 21, and a recess 52 is formed between any two adjacent ones of the protrusions 51, the recess 52 has a recess top surface 521, a second distance M2 is between the recess top surface 521 and the bulkhead 21, and the first distance M1 is greater than the second distance M2.

In this embodiment, each of the protrusions 51 respectively has a diffusion flame surface 512 facing the nozzle 40, and a flame holding hot-gas region 53 is formed between each of the diffusion flame surfaces 512 and the connected recess top surface 521, respectively.

Preferably, two ends the nozzle 40 respectively have a nozzle convergent section 41 connected to the combustion chamber 20, and a nozzle throat 42 opposite to the nozzle convergent section 41. The nozzle throat 42 has a diameter W1 extending along a radial direction, a length of the first distance M1 is 10% to 50% of the diameter W1. By limiting the length of the first distance M1 to 10% to 50% of the diameter W1, thereby allowing the solid fuel segment 50 to be more easily formed on the bulkhead 21 while maintaining the flame holding hot-gas regions 53 to even the regression rate of the solid fuel segment 50.

Preferably, each of the protrusion top surfaces 511 respectively has a first length N1 along the axial direction X', and one end of the combustion chamber 20 extends to another end is a second length N2, and each of the first lengths N1 is 5% to 25% of a total length of the second length N2.

The above is the structural configuration and connection relationship of the present invention in a first embodiment, and the operation manner of the present invention is as follows.

Figure 3:
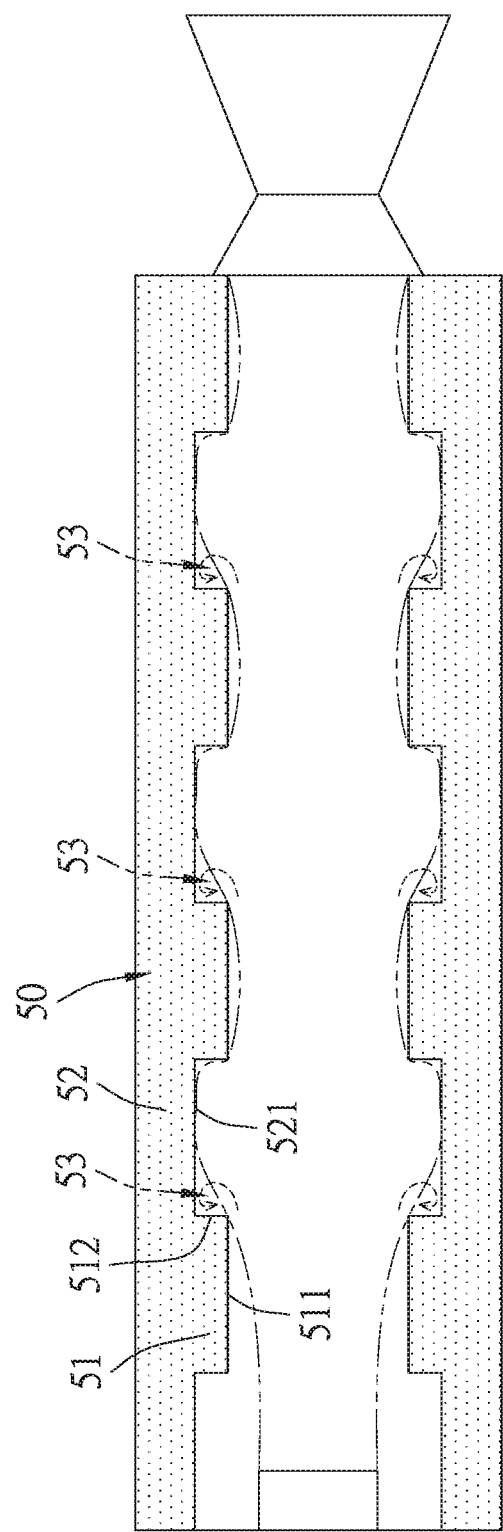
FIG. 3 is a schematic view showing an oxidizer being injected into a combustion port from an oxidizer injector in the first embodiment of the present invention.

Referring to FIG. 3, the oxidizer injector 30 injects a oxidizer along the axial direction X', and when the propellant mixture is burned in the combustion port 22, since on the solid fuel segment 50 is provided with the protrusions 51, the propellant mixture forms eddies in the flame holding hot-gas regions 53 as it passes through the flame holding hot-gas regions 53, and the propellant mixture has better mixing and combustion efficiency when passing through the flame holding hot-gas regions 53, thereby allowing the solid fuel segment 50 to have an even regression rate.

Figure 4:
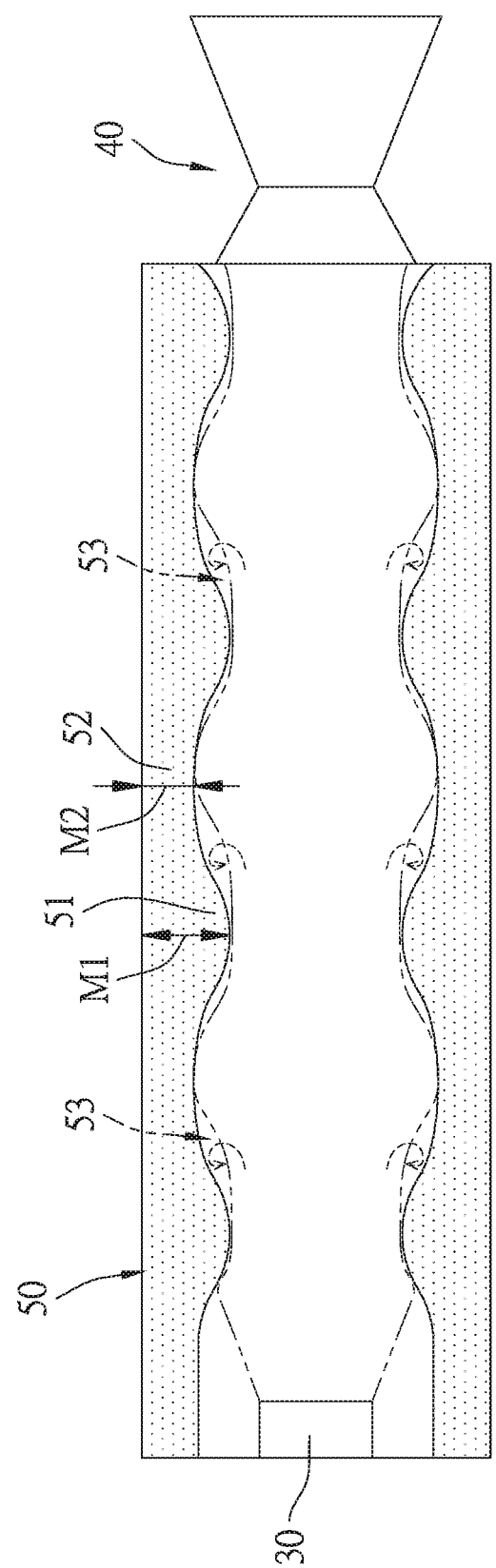
FIG. 4 is a cross-sectional view according to a second embodiment of the present invention.

Referring to FIG. 4, in a second embodiment, the protrusions 51 and the recesses 52 are composed of continuous curved surfaces, a distance between a top end of the protrusion 51 and the bulkhead 21 is the first distance M1, and a distance between a bottommost end of the recess 52 and the bulkhead 21 is the second distance M2.

Preferably, in the second embodiment, each of the protrusions 51 respectively has the diffusion flame surface 512 facing the nozzle 40, and the flame holding hot-gas region 53 is formed between each of the diffusion flame surfaces 512 and the connected recess top surface 521, respectively. When the propellant mixture passes through the flame holding hot-gas regions 53, eddies are formed, so that the propellant mixture has better combustion efficiency as it passes through the flame holding hot-gas regions 53.

Figure 5:
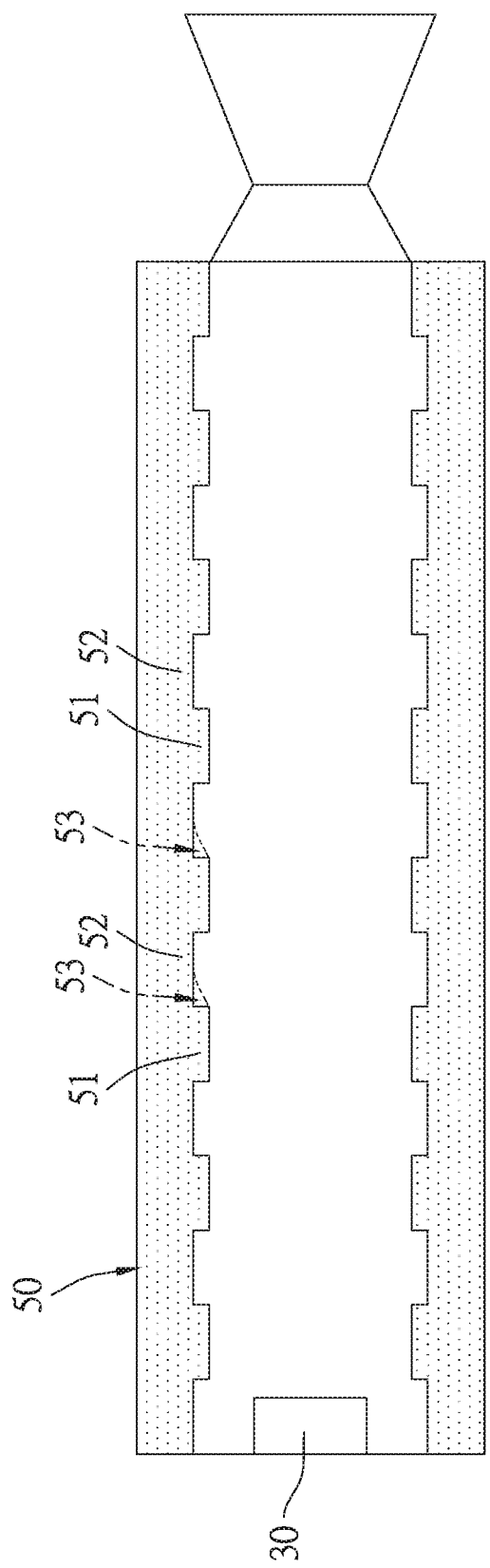
FIG. 5 is a cross-sectional view according to a third embodiment of the present invention.

Referring to FIG. 5, in a third embodiment, a user can install more of the protrusions 51 on the solid fuel segment 50 to form more of the flame holding hot-gas region 53 on the solid fuel segment 50, thereby the regression rate of the solid fuel segment 50 can be more evenly distributed on the solid fuel segment 50 surface.

Figure 6:
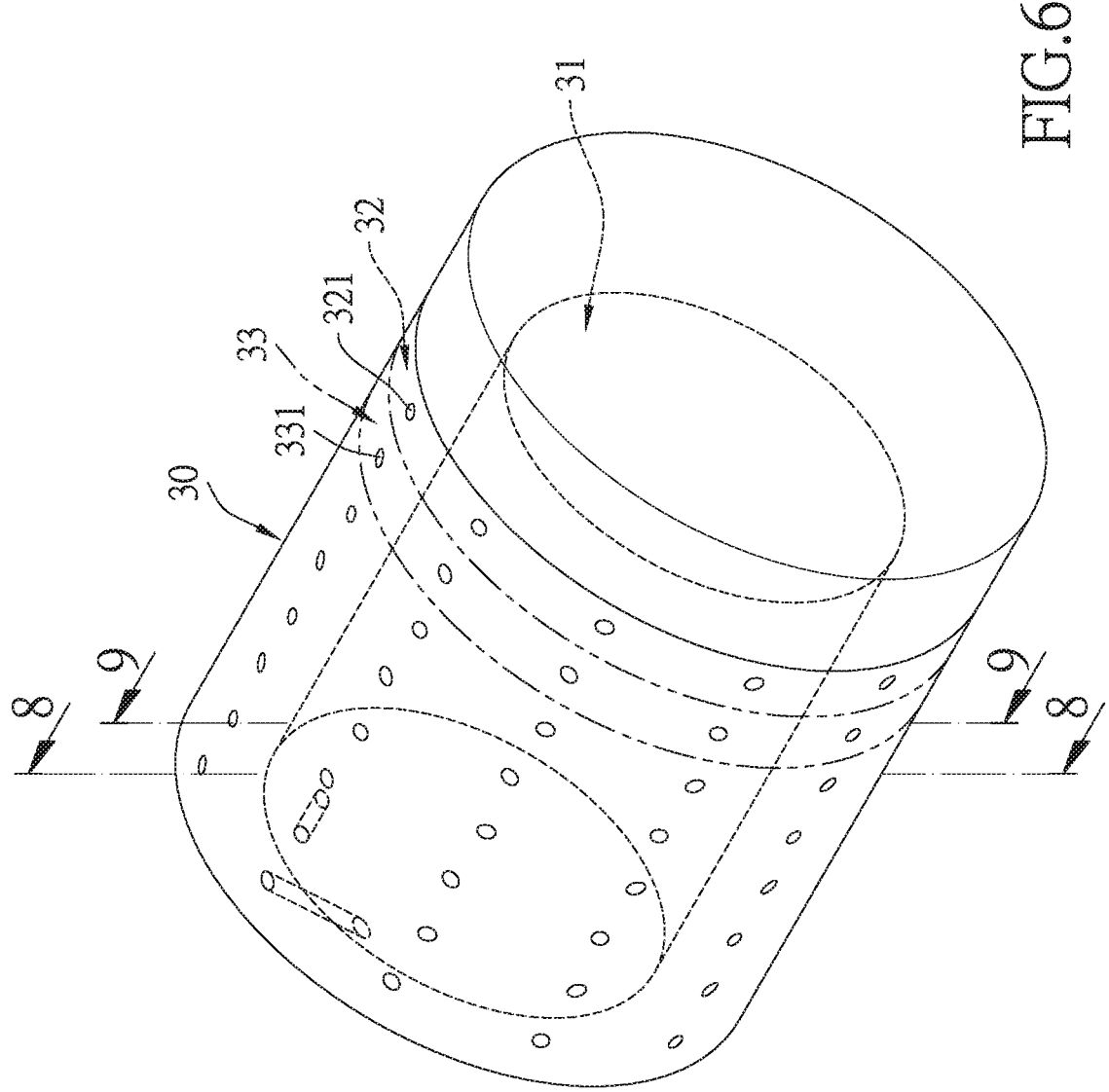
FIG. 6 is a perspective view of the oxidizer injector.
Figure 7:
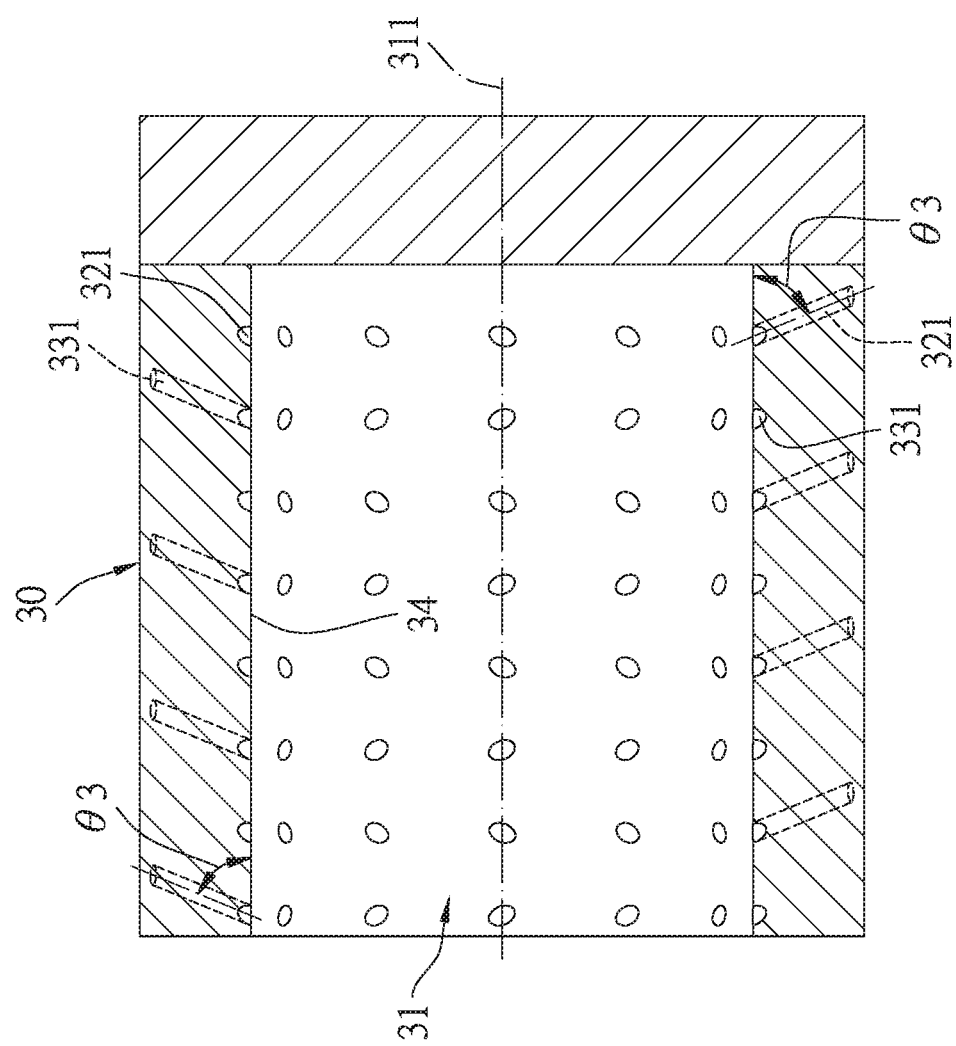
FIG. 7 is a cross-sectional view of the oxidizer injector.
Figure 9:
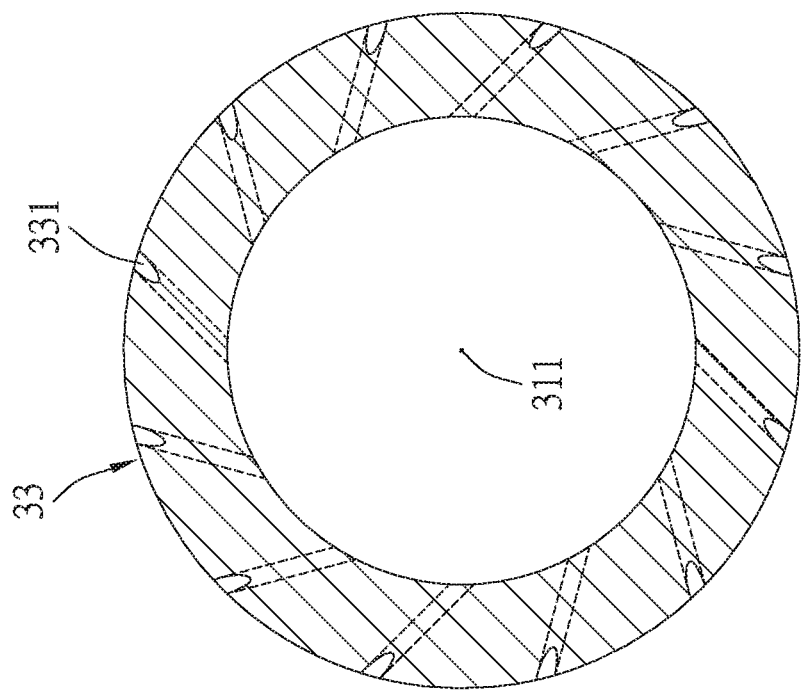
FIG. 9 is a cross-sectional view of a second runner assembly of the oxidizer injector.
Figure 8:
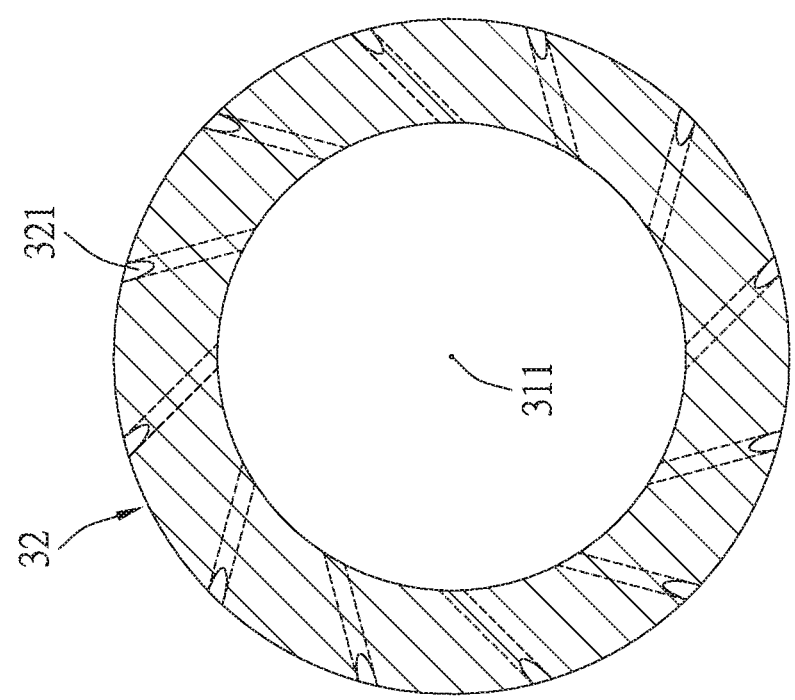
FIG. 8 is a cross-sectional view of a first runner assembly of the oxidizer injector.
Figure 10:
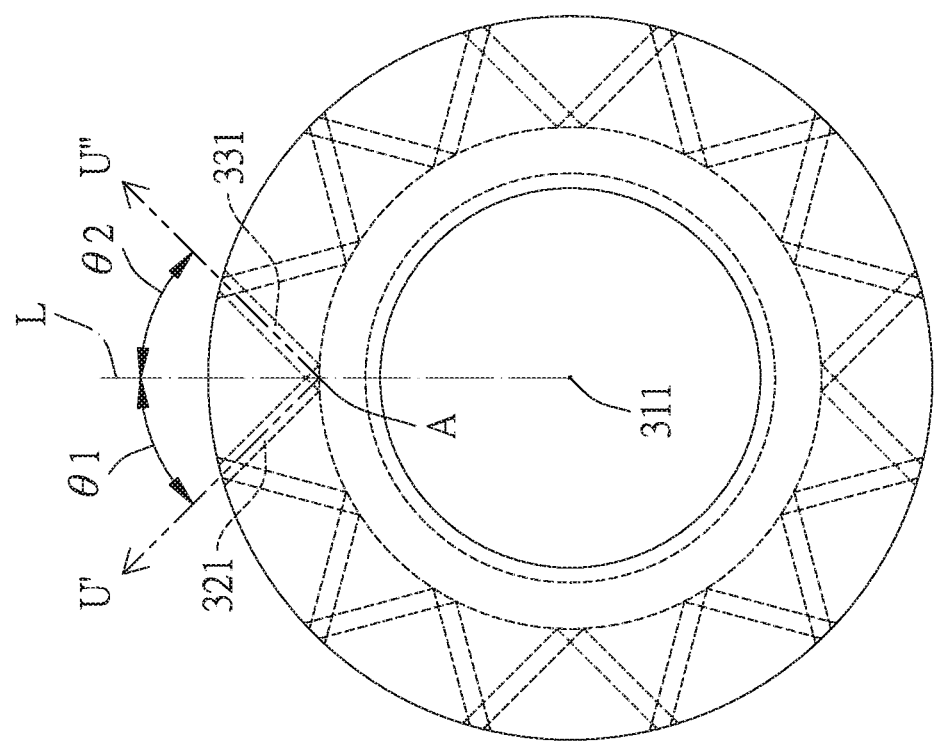
FIG. 10 is a perspective view of forward runners and reverse runners of the oxidizer injector.

Referring to FIG. 6, preferably, the oxidizer injector 30 has a feed passage 31 as well as a first runner assembly 32 and a second runner assembly 33 communicating with the feed passage 31. The feed passage 31 has an axis 311, the first runner assembly 32 and the second runner assembly 33 are sequentially arranged along the axis 311. The first runner assembly 32 has a plurality of forward runners 321, and the second runner assembly 33 has a plurality of reverse runners 331, each of the forward runners 321 is disposed along a forward running direction U', and each of the reverse runners 331 is disposed along a reverse running direction U". Taking a forward runner 331 and a reverse runner 332 that are adjacent to the axis in an opposite manner as a group, the forward running direction U' along which the forward runner 331 of the group is disposed is defined as a first forward running direction U', and one of the reverse running direction U" along which the reverse runner 332 of the group is disposed is defined as a first reverse running direction U". The first forward running direction U' and the first reverse running direction U" extend and a position of intersection is an intersection point A, and an extending direction extending from the intersection point A to the axis 311 is a central axis L, the first forward is runners 321 are on one side of the central axis L, and the first reverse runners 331 are on another side of the central axis L. A forward angle θ1 is formed between the first forward running direction U' and the central axis L, a reverse angle θ2 is formed between the first reverse running direction U" and the central axis L, and an absolute value of the forward angle θ1 and an absolute value of the reverse angle θ2 are equal.

In particular, the absolute value of the forward angle θ1 and the absolute value of the reverse angle θ2 are between 20 and 80 degrees to obtain an optimum combustion efficiency.

Preferably, the oxidizer injector 30 has an inner wall surface 34 facing the feed passage 31, an injection angle θ3 is formed between each of the forward runners 321 and the inner wall surface 34, as well as between each of the reverse runners 331 and the inner wall surface 34, the injection angle 83 is located on a side close to the nozzle 40, and the injection angle θ3 is between 20 and 90 degrees to obtain an optimum combustion efficiency.

Figure 11:
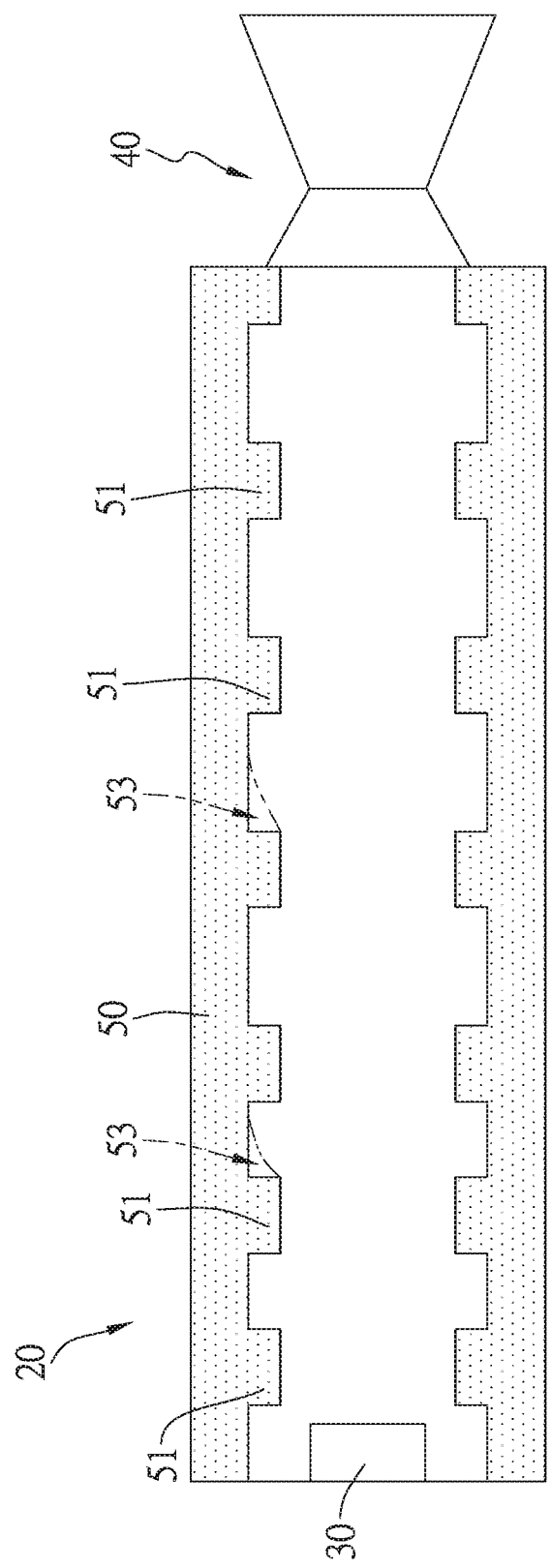
FIG. 11 is a cross-sectional view of a fourth embodiment of the present invention.

Preferably, as shown in FIG. 11, due to the state of combustion in the combustion chamber 20, the combustion efficiency is higher at the end close to the nozzle 40, and the combustion efficiency is lower at the other end close to the oxidizer injector 30. Therefore, the positions of the protrusions 51 distributed on the solid fuel segment 50 can be closer to one another at the end close to the oxidizer injector 30, and at the end away from the oxidizer injector 30 are further apart from one another, thereby more of the flame holding hot-gas region 53 are formed at the end of the solid fuel segment 50 closer to the oxidizer injector 30, so that the regression rate of the entire solid fuel segment 50 can be distributed more evenly.

In summary, the above embodiments and drawings are merely the preferred embodiments of the present invention, and the scope of implementation of the present invention is not limited thereto. In other words, all the equivalent changes and modifications made according to the appended claims shall still fall within the scope covered by the appended claims of the present invention.

What is claimed is:

1. A rocket engine with an improved solid fuel segment, comprising:
   a combustion chamber;
   a solid fuel segment installed in the combustion chamber; and
   an oxidizer injector installed in the combustion chamber, the oxidizer injector injecting an oxidizer into the combustion chamber, and generating a plurality of flame holding hot-gas regions on the solid fuel segment;
   wherein the solid fuel segment being disposed with a plurality of protrusions along the axial direction, and the positions of the protrusions distributed on the solid fuel segment are closer to one another at the end close to the oxidizer injector, and at the end away from the oxidizer injector are further apart from one another;
   wherein the oxidizer injector has a feed passage as well as a first runner assembly and a second runner assembly communicating with the feed passage, the feed passage has an axis, the first runner assembly and the second runner assembly are sequentially arranged along the axis, the first runner assembly has a plurality of forward runners, and the second runner assembly has a plurality of reverse runners, each of the forward runners is disposed along a forward running direction, and each of the reverse runners is disposed along a reverse running direction, taking a forward runner and a reverse runner that are adjacent to the axis in an opposite manner as a group, the forward running direction along which the forward runner of the group is disposed is defined as a first forward running direction, the reverse running direction along which the reverse runner of the group is disposed is defined as a first reverse running direction, the first forward running direction and the first reverse running direction extend and a position of intersection is an intersection point, and an extending direction extending from the intersection point to the axis is a central axis, the forward runner is on one side of the central axis, and the reverse runner is on another side of the central axis, a forward angle is formed between the first forward running direction and the central axis, a reverse angle is formed between the first reverse running direction and the central axis, and an absolute value of the forward angle and an absolute value of the reverse angle are equal.

2. A rocket engine with an improved solid fuel segment, comprising:
   a combustion chamber with a bulkhead surrounding and defining a combustion port, one end of the bulkhead being disposed with an oxidizer injector, and another end opposite to the oxidizer injector being disposed with a nozzle, and a direction of the oxidizer injector extending to the nozzle is an axial direction; and a solid fuel segment installed in the combustion port and located on the bulkhead, the solid fuel segment being disposed with a plurality of protrusions along the axial direction, the positions of the protrusions distributed on the solid fuel segment are closer to one another at the end close to the oxidizer injector, and at the end away from the oxidizer injector are further apart from one another, and a recess being formed between any two adjacent protrusions of the plurality of protrusions, and each of the recesses having a flame holding hot-gas region;

wherein the oxidizer injector has a feed passage as well as a first runner assembly and a second runner assembly communicating with the feed passage, the feed passage has an axis, the first runner assembly and the second runner assembly are sequentially arranged along the axis, the first runner assembly has a plurality of forward runners, and the second runner assembly has a plurality of reverse runners, each of the forward runners is disposed along a forward running direction, and each of the reverse runners is disposed along a reverse running direction, taking a forward runner and a reverse runner that are adjacent to the axis in an opposite manner as a group, the forward running direction along which the forward runner of the group is disposed is defined as a first forward running direction, the reverse running direction along which the reverse runner of the group is disposed is defined as a first reverse running direction, the first forward running direction and the first reverse running direction extend and a position of intersection is an intersection point, and an extending direction extending from the intersection point to the axis is a central axis, the forward runner is on one side of the central axis, and the reverse runner is on another side of the central axis, a forward angle is formed between the first forward running direction and the central axis, a reverse angle is formed between the first reverse running direction and the central axis, and an absolute value of the forward angle and an absolute value of the reverse angle are equal.

3. The rocket engine with the improved solid fuel segment as claimed in claim 2, wherein each of the protrusion top surfaces respectively has a first length along the axial direction, and one end of the combustion chamber extends to another end is a second length, and each of the first lengths is 5% to 25% of a total length of the second length.

4. The rocket engine with the improved solid fuel segment as claimed in claim 2, wherein the protrusions and the recesses are composed of continuous curved surfaces, a distance between a top end of each of the plurality of protrusions and the bulkhead is a first distance, a distance between a bottommost end of the recess and the bulkhead is second distance, and the first distance is larger than the second distance.

5. The rocket engine with the improved solid fuel segment as claimed in claim 2, wherein the absolute value of the forward angle and the absolute value of the reverse angle are between 20 and 80 degrees.

6. The rocket engine with the improved solid fuel segment as claimed in claim 2, wherein the oxidizer injector has an inner wall surface facing the feed passage, an injection angle is formed between each of the forward runners and the inner wall surface, as well as between each of the reverse runners and the inner wall surface, the injection angle is located on a side close to the nozzle, and the injection angle is between 20 and 90 degrees.

7. A rocket engine with an improved solid fuel segment, comprising:
a combustion chamber with a bulkhead surrounding and defining a combustion port, one end of the bulkhead being disposed with an oxidizer injector, and another end opposite to the oxidizer injector being disposed with a nozzle, and a direction of the oxidizer injector extending to the nozzle is an axial direction; and
a solid fuel segment installed in the combustion port and located on the bulkhead, the solid fuel segment being disposed with a plurality of protrusions along the axial direction, each of the plurality of protrusions having a protrusion top surface, a first distance being between the protrusion top surface of each of the plurality of protrusions and the bulkhead, and a recess being formed between any two adjacent ones of the plurality of protrusions, the recess having a recess top surface, a second distance being between the recess top surface and the bulkhead, and the first distance being greater than the second distance, the positions of the protrusions distributed on the solid fuel segment are closer to one another at the end close to the oxidizer injector, and at the end away from the oxidizer injector are further apart from one another;
wherein the oxidizer injector has a feed passage as well as a first runner assembly and a second runner assembly communicating with the feed passage, the feed passage has an axis, the first runner assembly and the second runner assembly are sequentially arranged along the axis, the first runner assembly has a plurality of forward runners, and the second runner assembly has a plurality of reverse runners, each of the forward runners is disposed along a forward running direction, each of the reverse runners is disposed along a reverse running direction, taking a forward runner and a reverse runner that are adjacent to the axis in an opposite manner as a group, the forward running direction along which the forward runner of the group is disposed is defined as a first forward running direction, the reverse running direction along which the reverse runner of the group is disposed is defined as a first reverse running direction, the first forward running direction and the first reverse running direction extend and a position of intersection is an intersection point, and an extending direction extending from the intersection point to the axis is a central axis, the forward runner is on one side of the central axis, and the reverse runner is on another side of the central axis, a forward angle is formed between the first forward running direction and the central axis, a reverse angle is formed between the first reverse running direction and the central axis, and an absolute value of the forward angle and an absolute value of the reverse angle are equal.

8. The rocket engine with the improved solid fuel segment as claimed in claim 1, wherein the nozzle has a nozzle throat, the nozzle throat has a diameter extending along a radial direction, the first distance is 10% to 50% of the diameter of the nozzle throat.

9. The rocket engine with the improved solid fuel segment as claimed in claim 1, wherein each of the protrusion top surfaces respectively has a first length along the axial direction, and one end of the combustion chamber extends to another end is a second length, and each of the first lengths is 5% to 25% of a total length of the second length.

* * * * *